G. H. TAGGARD.
COOLING JACKET FOR INTERNAL COMBUSTION ENGINES.
APPLICATION FILED JAN. 17, 1920.

1,386,381.
Patented Aug. 2, 1921.

INVENTOR.
GEORGE H. TAGGARD
BY
ATTORNEYS.

UNITED STATES PATENT OFFICE.

GEORGE H. TAGGARD, OF WALLA WALLA, WASHINGTON.

COOLING-JACKET FOR INTERNAL-COMBUSTION ENGINES.

1,386,381.   Specification of Letters Patent.   Patented Aug. 2, 1921.

Application filed January 17, 1920. Serial No. 352,162.

*To all whom it may concern:*

Be it known that I, GEORGE H. TAGGARD, a citizen of the United States, residing at Walla Walla, in the county of Walla Walla and State of Washington, have invented certain new and useful Improvements in Cooling-Jackets for Internal-Combustion Engines, of which the following is a specification.

This invention relates to a jacket to be applied to air cooled internal combustion engines for cooling purposes and has for its objects to provide a means that may be attached conveniently to an air cooled engine as a perfect cooling device.

A further object is to provide a means for forcing a current of air against and in a swirl about the cylinder of an internal combustion engine.

A further object is to provide a means for supplying a current of air about the cylinders of an engine and upward with the air outlet terminating at the top of the cylinders thereby providing an unobstructed and free exit.

With these and other objects in view reference is had to the accompanying drawings, in which—

Having reference to the drawings like numerals refer to like parts throughout and the numeral 1 refers to the outer jacket of the cooling jacket and is formed in the shape of a funnel with the relatively pointed end 2 at the rear of the engine and with the enlarged end 3 extending forward thereof and preferably resting against the front piece 4 which may have the form of the usual radiator.

Figure 1:
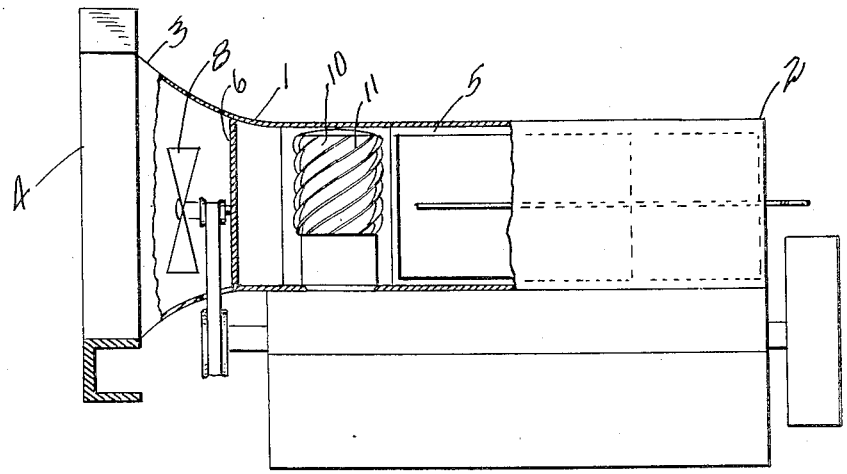
Figure 1 is a side elevation of the device on the line 1—1 of Fig. 2.
Figure 2:
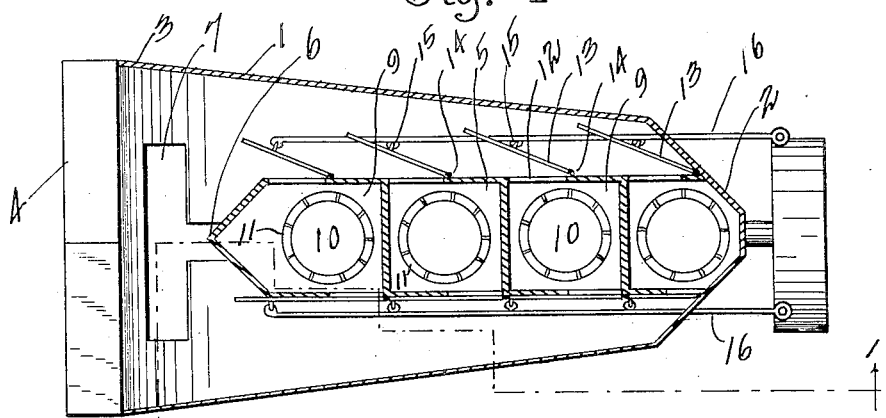
Fig. 2 is a plan view with the top removed.

Within the outer jacket is an inner jacket 5 centrally located between the side walls of the outer jacket and terminating at its forward end in a point 6 to more equally divide the incoming air current. The bottom portion of the bell of the funnel may be slotted 7, as shown in Fig. 2 so that the jacket may be conveniently passed over the fan 8 of the engine in installation, the usual fan being retained to assist the air current; and as the fan is directly in front of the above mentioned point 6 of the inner jacket the purpose of this point is now obvious.

Within the inner jacket are compartments 9, in this case each compartment being designed to contain one cylinder 10 of the engine, it must here be understood however that each compartment may be of sufficient size to encompass more than one cylinder where more than one cylinder is cast en bloc, in which case the vanes 11 would still, preferably, encircle the cylinders spirally.

Figure 3:
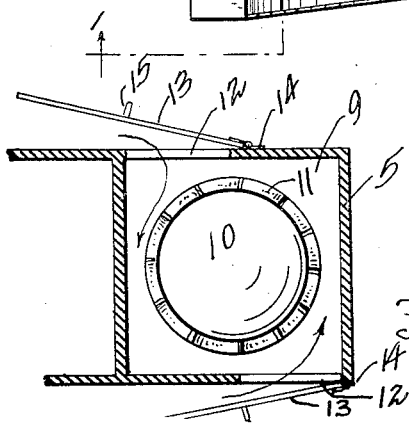
Fig. 3 is an enlarged view of one of the compartments showing direction of air currents.

Each compartment is provided with closable openings 12 which in my preferred form are positioned one ahead of the center line of the cylinder with the corresponding opposite opening to the rear of the said center line in a manner to guide the inrushing air around the cylinder in a swirl (as shown by the arrows in Fig. 3) and in the direction of the vanes which are designed to guide the air upward to a free and unobstructed discharge at the upper end of the cylinder.

Each closable opening is provided with a closure 13 whereby the size of the opening may be regulated, the closures being hinged 14 to the device in any suitable manner, with a hinged joint 15 suitably positioned on the closure and attached movably to a connecting rod 16 wherewith to manually operate the closures.

The closures by swinging outward, form with the wall of the outer jacket an air passage of variable and progressive size as clearly shown in Fig. 2 where the closures are shown in the partly open position, the progressive size of this opening providing the proper amount of air for each cylinder.

In use the device is placed over the cylinders of the engine and with the engine running or with the car in motion the air enters the outer jacket and is divided by the pointed end of the inner jacket to flow on both sides of the inner jacket whence it is guided into and about the cylinders by the closures, which being of irregular length form with the outer wall of the outer jacket an air passage through which the air reaches the cylinders.

By partly opening or closing the closures the right amount of air enters the compartments about the cylinders giving the proper amount of cooling to each cylinder.

Thus with this device the proper amount of air to cool the cylinder is obtainable at all times and by its unobstructed passage the air will pass away from the cylinders in a highly efficient manner.

Having thus described my invention I claim—

1. In a cooling jacket for internal combustion engines, an outer jacket, an inner jacket, partitions in said inner jacket forming compartments, said compartments extending from the bottom of said outer jacket to the top thereof and having both ends open, closable openings in the sides of said inner jacket, closures hingeably attached to said cooling jacket and operable against said closable openings, and a means for operating said closures through the walls of said outer jacket.

2. In a cooling jacket for internal combustion engines, a funnel shaped outer jacket, an inner jacket having a pointed forward end, compartments in said inner jacket to register with the cylinders of said engine, said compartments being provided with oppositely positioned closures, said closures being of variable size to form with the wall of said outer jacket an air passage of progressive size, and a means for operating said closures.

3. In a cooling jacket for internal combustion engines, a funnel shaped outer jacket having a relatively pointed rearward end and an enlarged forward end, an inner jacket centrally located in said outer jacket and provided with a pointed forward end, compartments in said inner jacket, said compartments being provided with oppositely positioned closures with one of said closures positioned ahead of the center line of the cylinder of said engine and with its corresponding opposite closure positioned to the rear of said center line, said closures being of a size to form with the wall of said outer jacket, when said closures are in their open position, an air passage of progressive size, and a means for opening said closures.

In testimony whereof I affix my signature.

GEORGE H. TAGGARD.